G. T. BUCHANAN.
AIRPLANE.
APPLICATION FILED JUNE 21, 1918.

1,299,117.  Patented Apr. 1, 1919.

WITNESSES
J. S. Schrott

INVENTOR
George T. Buchanan
BY
ATTORNEYS

UNITED STATES PATENT OFFICE.

GEORGE TELLMAN BUCHANAN, OF WINNSBORO, SOUTH CAROLINA.

AIRPLANE.

1,299,117.  Specification of Letters Patent.  Patented Apr. 1, 1919.

Application filed June 21, 1918. Serial No. 241,173.

*To all whom it may concern:*

Be it known that I, GEORGE T. BUCHANAN, a citizen of the United States, and a resident of Winnsboro, in the county of Fairfield and State of South Carolina, have invented certain new and useful Improvements in Airplanes, of which the following is a specification.

My invention relates to improvements in airplanes, and it consists in the constructions and arrangements herein described and claimed.

An object of my invention is to provide a novel bracing arrangement for an airplane, which involves the constructing of a plurality of relatively narrow airplane wings on each side of the body, these wings being separate and making the wing structure open so as to reduce the likelihood of the total destruction of the wing structure on one or the other side by a well directed shot in combat.

Another object of the invention is to provide an airplane wherein the wing structure is composed of a plurality of metallic wings which act as braces for the airplane.

A further object of the invention is to provide an airplane of skeleton construction, such construction involving the use of a main supporting spar and a number of separate metallic wings on each side of the body, these wings acting as braces.

Figure 1:
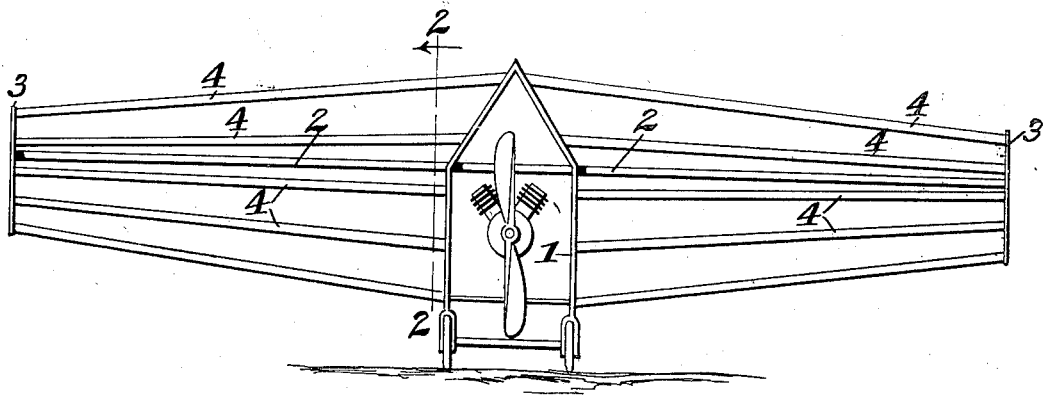
Figure 2:
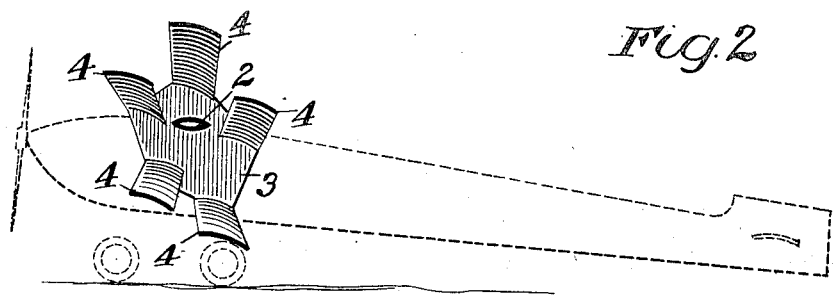
Figure 3:
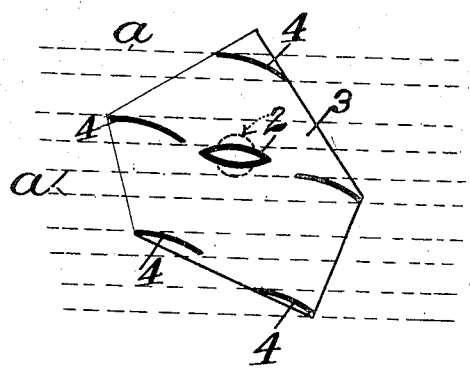

Other objects and advantages will appear in the following specification, reference being had to the accompanying drawing in which:

Figure 1 is a front elevation of an airplane constructed in accordance with my invention, Fig. 2 is a cross section on the line 2—2 of Fig. 1, and Fig. 3 is a detail view of one of the end plates.

The illustration of the invention in the drawing is largely diagrammatic as will be observed at once, but this diagrammatic showing relates principally to the structure of the airplane body and special emphasis is laid on the invention which resides in the structure of the airplane wings. The body of the airplane includes a frame 1 which reaches to a point at the top, as shown in Fig. 1.

A main spar 2 is rigidly fixed transversely of the body of the airplane and extends to a proper distance at each side. The spar 2 is made of hollow tubing and may be either round in cross section or elliptical as indicated in the drawing. The elliptical form of the spar is preferable in that considerably less resistance is offered to the forward travel of the airplane. However as stated, the spar 2 may be made round as indicated in dotted lines in Fig. 3, if such a structure is found more desirable.

End plates 3 are affixed to the extremities of the spar 2. The end plates 3 and the frame 1 offer means whereby a plurality of airplane wings 4 are rigidly secured in place.

In the present instance, there are five of the wings 4 on each side of the frame 1 and these are grouped around the spar 2 substantially as indicated in Fig. 3. The wings 4 are disposed at the proper angles of incidence. The forward continuations of the leading and trailing edges of the wings 4, as indicated by the dotted line *a* in Fig. 3, show the wings 4 to be spaced approximately at even distances apart in a vertical plane.

The spacing of the wings 4 is greater where they are attached to the frame 1 than where they are attached to the end plates 3. This arrangement provides a structure substantially as shown in Fig. 1. It will be perceived at once that this arrangement offers a rigid bracing for the airplane and the possibility of the collapse of the wings 4, even under great strain, is rather remote.

The widths of the wings 4 will in actual practice be such as to equal the width of an airplane wing of the present construction. The relatively narrow formation of each of the wings 4 enables them to be constructed of metal. This is an advantage which is denied by the present airplane wing constructions. The open or skeleton formation of the airplane makes the possibility of the destruction of one of the wing structures by such means as a shot, rather remote. While each wing structure is open as indicated in Fig. 2, yet no supporting surface is sacrificed.

While the construction and arrangement of the airplane as herein described and illustrated is that of a generally preferred form, obviously modifications and changes may be made without departing from the spirit of the invention or the scope of the claims.

I claim:—

1. An airplane comprising a body frame, main supporting means including a spar, a plurality of wings extending from said frame and grouped around said supporting means, the vertical space between the leading and trailing edges of one wing being approximately equal to the space between the trailing edge of one wing and the leading edge of an adjacent wing, and means at the ends of the supporting means providing an attachment for said wings.

2. An airplane comprising a body frame, a main supporting spar carried by the frame and extending beyond the sides, a plurality of rigid wings each attached at one end to an adjacent portion of the frame and converging toward the extremities of the spar, said wings being spaced apart vertically and horizontally, and means on the extremities of the spar providing an attachment for the other ends of the wings.

3. An airplane comprising a body frame, a main supporting spar disposed transversely of the body frame, end plates mounted on the extremities of the spar, and a plurality of stiff relatively narrow wings arranged in a circle around the spar and attached to the frame and the end plates at their respective ends, said wings acting as braces for the spar.

GEORGE TELLMAN BUCHANAN.